J. F. W. DORMAN.
Hand-Stamps.
No. 8,223. Reissued May 7, 1878.
FIG. I.
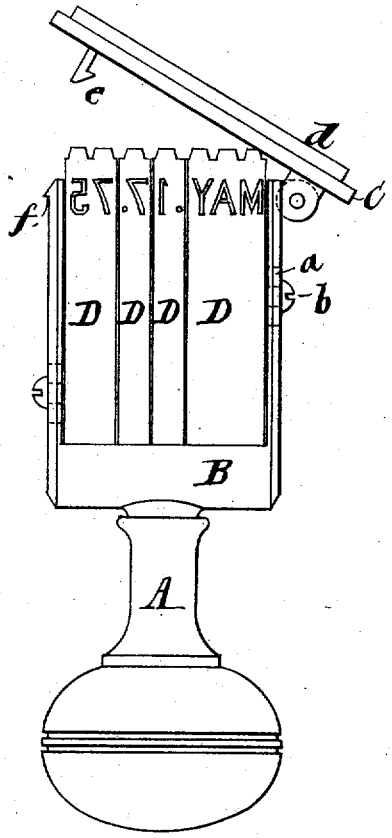
FIG. II.
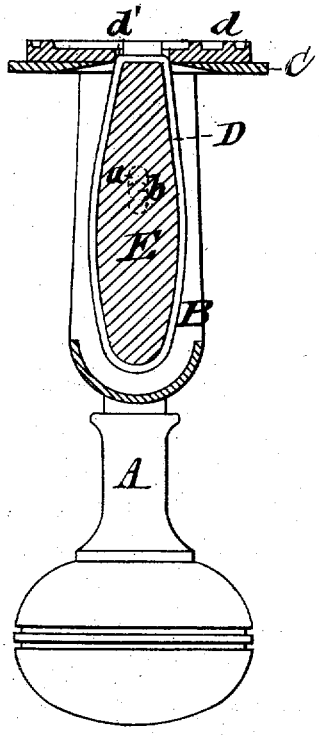
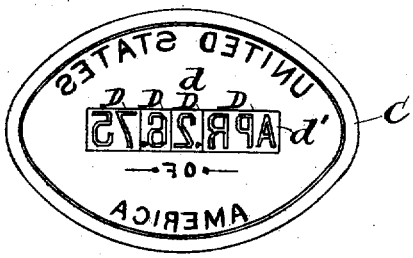
WITNESSES:
J. A. Tauberschmidt
B. Buckingham
INVENTOR:
John F. W. Dorman,
by G. W. T. Howard
Atty.
N. PETERS, PHOTO-LITHOGRAPHER, WASHINGTON, D. C.

UNITED STATES PATENT OFFICE.

JOHN F. W. DORMAN, OF BALTIMORE, MARYLAND.

IMPROVEMENT IN HAND-STAMPS.

Specification forming part of Letters Patent No. 164,273, dated June 8, 1875; Reissue No. 8,223, dated May 7, 1878; application filed February 2, 1878.

*To all whom it may concern:*

Be it known that I, JOHN F. W. DORMAN, of the city of Baltimore, in the State of Maryland, have invented certain Improvements in Rubber Hand-Stamps, of which the following is a specification, reference being had to the accompanying drawing, and to the letters of reference marked thereon.

This invention relates to that class of hand-stamps wherein different expressions are printed by the use of movable characters, which are successively brought to the printing end of the stamp.

The invention consists, first, in an endless rubber printing-band, having raised characters thereon and homogeneous therewith, as a new article of manufacture.

The invention consists, secondly, in a series of endless rubber bands, having raised characters thereon and homogeneous therewith, combined with a suitable supporting-frame and handle, which bands, by relative arrangement one with the other, will form a complete set of intelligible characters for printing purposes.

The invention consists, thirdly, in combining with the said endless rubber bands and framework a rubber printing-face, containing an invariable arrangement of raised characters, whereby a variable and fixed combination of characters may be printed, constituting in the aggregate a required form of words or expression.

The invention consists, fourthly, in certain details of construction found in the hand-stamp, as hereinafter particularly described.

In the accompanying drawing, Figure 1 is a side view of a hand-stamp embodying my invention. Fig. 2 is an edge view of the stamp, the upper portions being in section. Fig. 3 is a view of the printing-face.

Similar letters of reference indicate similar parts of the invention in all the views.

A is a handle, into which is screwed or otherwise secured a type-case, B. To one of the sides of the type-case is hinged the plate C, upon which is a rubber covering, *d*, the letters, figures, &c., upon which form the portion of the printing-face intended to remain unchanged.

The center of the plate C is cut out at *d'* a length equal to the distance between the sides of the type-case. D D, &c., are endless rubber bands, each having molded on its edge the figures, letters, &c., which, by a proper combination or reciprocal adjustment, can be made to indicate the year, month, and day of the month, or interchangeable portion of the expression to be printed. The rubber bands D surround a support, over and about which they are movable. The means herein shown consist of the support E, which is arranged centrally of the type-case, extending between the two sides thereof. The support E may be vertically adjusted, slots *a* in the sides of the type-case B, through which the screws *b* pass, admitting of the adjustment.

It being desired to stamp, in addition to the lettering, &c., contained on the rubber covering of the plate C, any required date, the hook *e* of the hinged plate C is first detached from the catch *f* by pressing the sides of the type-case slightly together by hand, and moved up, as shown in Fig. 1. The bands D are then moved around their support, in order to bring the required letters and figures to the printing-face. The plate C, bearing an invariable arrangement of printing-characters, is then clasped down, the opening *d'* fitting over the raised letters and figures, holding them in place. The stamp is then ready for use.

Should it be found that the faces of the movable letters, figures, &c., are at any time below the plane of the fixed portion of the printing-face, the movable parts can be adjusted to the said plane, as hereinbefore seen. This necessity sometimes occurs when the rubber face *d* has been removed and another substituted varying somewhat therefrom in thickness.

By hinging the plate C, a smaller central opening can be used than if the letters and figures were capable of being moved without raising the said plate, and a larger amount of lettering is thereby procured thereon.

I claim as my invention and wish to secure by Letters Patent of the United States—

1. As a new article of manufacture, an endless rubber printing-band, having raised intelligible characters thereon integral with the substance thereof, and adapted for use in a hand-stamp, substantially as set forth.

2. A series of endless rubber bands, having raised intelligible characters thereon integral with the substance thereof, and adapted for use in a hand-stamp, combined with a suitable supporting-frame, the said endless bands being adapted to be revolved upon or about their support, substantially as herein specified.

3. A series of endless rubber bands, having upon their exterior raised intelligible characters, a frame-work or support for said bands, and a rubber printing-face, containing a fixed arrangement of raised characters, combined in a hand-stamp, substantially as herein described.

4. In a hand-stamp, a series of endless rubber bands having raised printing-characters upon their exterior, combined with a vertically-adjustable support, upon or around which they may be revolved, substantially as herein set forth.

5. A type-case and handle, combined with an adjustable support for a series of endless rubber bands, substantially as set forth.

6. The endless rubber type-bands D, support E, and type-case B, combined substantially as specified.

7. The slotted type-case B, combined with the support E and screw *b*, substantially as set forth.

8. The combination of the type-case B, handle A, vertically-adjustable support E, rubber type-bands D, and self-clasping hinged plate C, having the rubber type-face *d*, substantially as and for the purposes specified.

In testimony whereof I have hereto subscribed my name this 1st day of February, 1878.

JOHN F. W. DORMAN.

Witnesses:
WM. T. HOWARD,
THOS. MURDOCH.